US011523046B2

United States Patent
Hong et al.

(10) Patent No.: US 11,523,046 B2
(45) Date of Patent: Dec. 6, 2022

(54) SYSTEM AND METHOD TO CORRECT FOR VARIATION OF IN-FOCUS PLANE ACROSS A FIELD OF VIEW OF A MICROSCOPE OBJECTIVE

(71) Applicant: Molecular Devices, LLC, San Jose, CA (US)

(72) Inventors: Dihui Hong, Chester Springs, PA (US); Stephen Rhein, Phoenixville, PA (US); Avrum Cohen, Downingtown, PA (US); Steve Luke, Downingtown, PA (US)

(73) Assignee: Molecular Devices, LLC, San Jose, CA (US)

( * ) Notice: Subject to any disclaimer, the term of this patent is extended or adjusted under 35 U.S.C. 154(b) by 58 days.

(21) Appl. No.: 16/429,955

(22) Filed: Jun. 3, 2019

(65) Prior Publication Data
US 2020/0382715 A1 Dec. 3, 2020

(51) Int. Cl.
H04N 5/232 (2006.01)
H04N 5/225 (2006.01)
G02B 21/24 (2006.01)
G02B 7/38 (2021.01)
G02B 21/36 (2006.01)

(52) U.S. Cl.
CPC ......... *H04N 5/232125* (2018.08); *G02B 7/38* (2013.01); *G02B 21/244* (2013.01); *G02B 21/365* (2013.01); *H04N 5/2256* (2013.01)

(58) Field of Classification Search
USPC .......................................................... 348/79
See application file for complete search history.

(56) References Cited

U.S. PATENT DOCUMENTS 6,004,313 A * 12/1999 Shimmick ............... A61F 9/008
351/205
6,406,473 B1 * 6/2002 Shimmick ............... A61F 9/008
128/898

(Continued)

*Primary Examiner* — Christopher S Kelley
*Assistant Examiner* — Asmamaw G Tarko
(74) *Attorney, Agent, or Firm* — McCracken & Gillen LLC (57) ABSTRACT

A computer implemented system and method for generating a focus corrected image of a sample disposed on a sample holder of an imaging system is disclosed. The imaging system includes an image sensor and a lens moveable relative to the image sensor between a first position and a second position. A characteristic map of the lens is developed that associates coordinates of each pixel of an image generated by the imaging sensor with one of a first plurality of locations of the lens between the first position and the second position. An image generator develops an output pixel of a focus-corrected image of a sample from a plurality of images of the sample acquired when the lens is positioned at a corresponding one of a second plurality of locations of the lens between the first position and the second position. The image generator selects a second location in accordance with the characteristic map, an image from the plurality of images of the sample associated with the second location, and determines a value of the output pixel in accordance with a value of a pixel of the selected one of the plurality of images that corresponds to the output pixel.

18 Claims, 7 Drawing Sheets

(56) References Cited

U.S. PATENT DOCUMENTS

| | | | | |
|---|---|---|---|---|
| 6,711,283 B1* | 3/2004 | Soenksen | | H04N 1/193 382/133 |
| 2004/0227822 A1* | 11/2004 | Cartlidge | | G01N 21/9501 348/207.99 |
| 2006/0045505 A1* | 3/2006 | Zeineh | | G02B 21/365 396/89 |
| 2007/0069106 A1* | 3/2007 | Krief | | G06T 5/50 250/201.3 |
| 2007/0069127 A1* | 3/2007 | Okuda | | H01J 37/29 250/310 |
| 2008/0272273 A1* | 11/2008 | Krief | | G06K 9/00134 250/201.3 |
| 2009/0002811 A1* | 1/2009 | Uchiyama | | G02B 21/241 359/383 |
| 2009/0074284 A1* | 3/2009 | Zeineh | | G02B 21/367 250/201.3 |
| 2012/0033064 A1* | 2/2012 | Yamada | | G02B 21/367 348/79 |
| 2012/0235036 A1* | 9/2012 | Hatakeyama | | H01J 37/265 250/310 |
| 2014/0126691 A1* | 5/2014 | Zheng | | G02B 21/365 378/43 |
| 2014/0334745 A1* | 11/2014 | Fleischer | | G06T 3/4061 382/284 |
| 2016/0080632 A1* | 3/2016 | Iwase | | G02B 21/365 348/79 |
| 2016/0086027 A1* | 3/2016 | Sibarita | | G06T 7/70 382/207 |
| 2016/0266366 A1* | 9/2016 | Chung | | G02B 21/008 |
| 2017/0078549 A1* | 3/2017 | Emtman | | H04N 5/2254 |
| 2017/0318216 A1* | 11/2017 | Gladnick | | G02B 21/367 |
| 2018/0191948 A1* | 7/2018 | Zheng | | G02B 21/362 |
| 2019/0049712 A1* | 2/2019 | Kim | | G02B 13/0095 |
| 2019/0052793 A1* | 2/2019 | Vink | | H04N 5/232133 |
| 2019/0137753 A1* | 5/2019 | Chan | | H04N 5/247 |
| 2019/0174079 A1* | 6/2019 | Anthony | | G02B 27/58 |
| 2019/0281227 A1* | 9/2019 | Hirano | | G02B 21/0012 |
| 2019/0391012 A1* | 12/2019 | Kokota | | G02B 21/244 |
| 2019/0391078 A1* | 12/2019 | Cohen | | G02B 21/365 |
| 2020/0195836 A1* | 6/2020 | Senekerimyan | | G02B 21/025 |

* cited by examiner

SYSTEM AND METHOD TO CORRECT FOR VARIATION OF IN-FOCUS PLANE ACROSS A FIELD OF VIEW OF A MICROSCOPE OBJECTIVE

FIELD OF DISCLOSURE

The present subject matter relates to microscopy systems, and more particularly, to a system and a method to develop focus-corrected images therefrom.

BACKGROUND

An imaging system may be used to obtain a microscopy image of a biological sample. Such image may be processed using an image analysis system to identify pixels of the image that are associated with objects of interest (cells, organelles, and the like) therein, to classify the different types of objects of interest represented in the image, to obtain metrics regarding such objects of interest or portions thereof and the like. Such metrics may include, for example, a count of the objects of interest, a count of each type of object of interest represented in the biological sample, sizes (area, perimeter, volume) of the cells, statistics (mean, mode, median, standard deviation, etc.) of the sizes of the objects of interest, and the like.

The imaging system includes an X-Y stage on which a sample to be imaged may be placed, a light source, an objective lens, and an image sensor (e.g., a charge-coupled device, a complementary metal-oxide-semiconductor sensor, or another light sensitive sensor). The objective lens may be a single lens or a compound lens comprising multiple lenses coupled to one another.

The stage and the image sensor typically have parallel planar surfaces facing one another and the objective lens (either a single lens or a compound lens) is disposed between such surfaces. The objective lens and the image sensor may be moved as a unit along a direction perpendicular to such surfaces to adjust the distance between the objective lens and the stage. Moving the objective lens and image sensor in this manner determines a focus plane between the stage and the object lens that will be brought into focus on the image sensor. The image sensor generates signals in accordance with the image formed thereon, and such signals are used to determine pixels of an output image generated by the image sensor. However, because of, for example, field curvature or other focal aberrations of the objective lens, a peripheral (or other) portion of the image formed on the image sensor may be out of focus when the central portion of the image is in focus.

The focal aberrations described above may be ameliorated by including additional lenses to a compound objective lens and/or selecting different materials of one or more lenses that comprise the objective lens. However, even with the use of such additional lenses or materials, such focal aberrations may not be eliminated. In addition, the use of such additional lenses may add significant cost to the imaging system or negatively impact other factors of the imaging system such as, for example, light throughput.

SUMMARY

According to one aspect, a computer implemented system for generating an image of a sample on a sample holder using an imaging system comprising an image sensor and a lens moveable relative to the sample holder between a first position and a second position, wherein the image sensor generates a two-dimensional array of pixels, comprises an image acquirer and an image generator. The image acquirer operates on a processor and receives a plurality of images of the sample from the image sensor, wherein each of the plurality of images of the sample is captured when the lens is positioned at a corresponding one of a first plurality of locations of the lens between the first position and the second position. The image generator selects a characteristic map associated with the lens, wherein the characteristic map associates coordinates of each pixel of an image generated by the image sensor with one of a second plurality of locations of the lens between the first position and the second position. In addition, the image generator selects a first location from the second plurality of locations associated with coordinates of an output image pixel in accordance with the characteristic map, selects a second location from the first plurality of locations in accordance with the first location, selects an image from the plurality of images of the sample associated with the second location, and determines a value of the output pixel in accordance with a value of a pixel of the selected one of the plurality of images that corresponds to the output pixel.

According to another aspect, a method of generating an image of a sample using an imaging system that comprises an image sensor and a lens moveable relative to the the sample between a first position and a second position, includes the step of causing a non-transitive computing device to select a characteristic map associated with the lens. The characteristic map associates a coordinate of each pixel of an image generated by the image sensor with one of a first plurality of locations of the lens between the first position and the second position. The non-transitive computing device also receives a plurality of images of the sample from the image sensor, wherein each of the plurality of images of the sample is captured when the lens is positioned at a corresponding one of a second plurality of locations of the lens between the first position and the second position, and selects a first location from the first plurality of locations associated with coordinates of an output image pixel, selects a second location from the second plurality of locations in accordance with the first location, and selects an image from the plurality of images of the sample associated with the second location. The non-transitive computing device also determines a value of the output pixel in accordance with a value of a pixel of the selected one of the plurality of images that corresponds to the output pixel.

Other aspects and advantages will become apparent upon consideration of the following detailed description and the attached drawings wherein like numerals designate like structures throughout the specification.

DETAILED DESCRIPTION

As should be apparent to one who has ordinary skill in the art, each pixel of an image produced by the image sensor is associated with X- and Y-coordinates, and such coordinates are associated with a particular region of the image sensor.

In accordance with the embodiments described herein, a system to generate a focus-corrected image (also herein as a focus correction system) develops a characteristic map of the focal characteristics of the objective lens. In particular, a substantially planar focusing target is disposed on the stage, the objective lens is positioned at a predetermined minimum distance from a focus plane of the focusing target, and a first focus target image is generated by the image sensor. Thereafter, the object lens is moved away from the focus plane of the focusing target by a first predetermined step size and a second focus target image is generated by the image sensor. A plurality of focus target images is generated in this manner until the distance between the focus plane of the focusing target and the objective lens is at least a first predetermined maximum distance.

The images comprising the plurality of focus target images are analyzed to select, for each pixel produced by the image sensor, a focus target image in which a region (or image subsection) surrounding such pixel has the best focus.

To develop the characteristic map, the focus correction system image associates X- and Y-coordinates of pixels generated by the image sensor with a Z-coordinate represented by the distance of objective lens from the focus plane of the focusing target when the selected image was acquired.

After the characteristic map is developed for a particular objective lens, the focus correction system may use such characteristic map to generate an image of a sample disposed on the stage in which focal aberrations have been corrected (i.e., reduced or even eliminated). In particular, the sample is disposed on the stage and the objective lens is disposed at a second minimum distance from the focus plane of the sample and a first image of the sample is acquired by the image sensor. Thereafter, the objective lens is moved away from the sample by a second predetermined step size and a second image of the sample is acquired. The objective lens is positioned in this manner and additional images of the sample are acquired until the objective lens reaches at least a second maximum distance from the focus plane of the sample. In some embodiments, the second minimum distance is greater than or equal to the first minimum distance and the second maximum distance is less than or equal to the first maximum distance. The first step size may be identical to or different than the second step size.

The plurality of images is processed by the system to create an output image in which out-of-focus regions due to focal aberrations of the lens, such as field curvature, are reduced. Specifically, for each pixel at coordinates (X, Y) of the output image, the focus correction system uses the characteristic map to determine a value of a coordinate Z that results in the best focus in the region of pixels associated with the coordinates (X, Y). Thereafter, the focus correction system selects from the plurality of images of the sample, an image of the sample associated with the coordinate Z and sets an intensity value of the pixel at coordinates (X, Y) of the output image at coordinates to be an intensity value of pixel at coordinates (X, Y) of the selected image. The focusing correction system selects the intensity values of all of the pixels of the output image in this manner to produce such output image.

Figure 1:
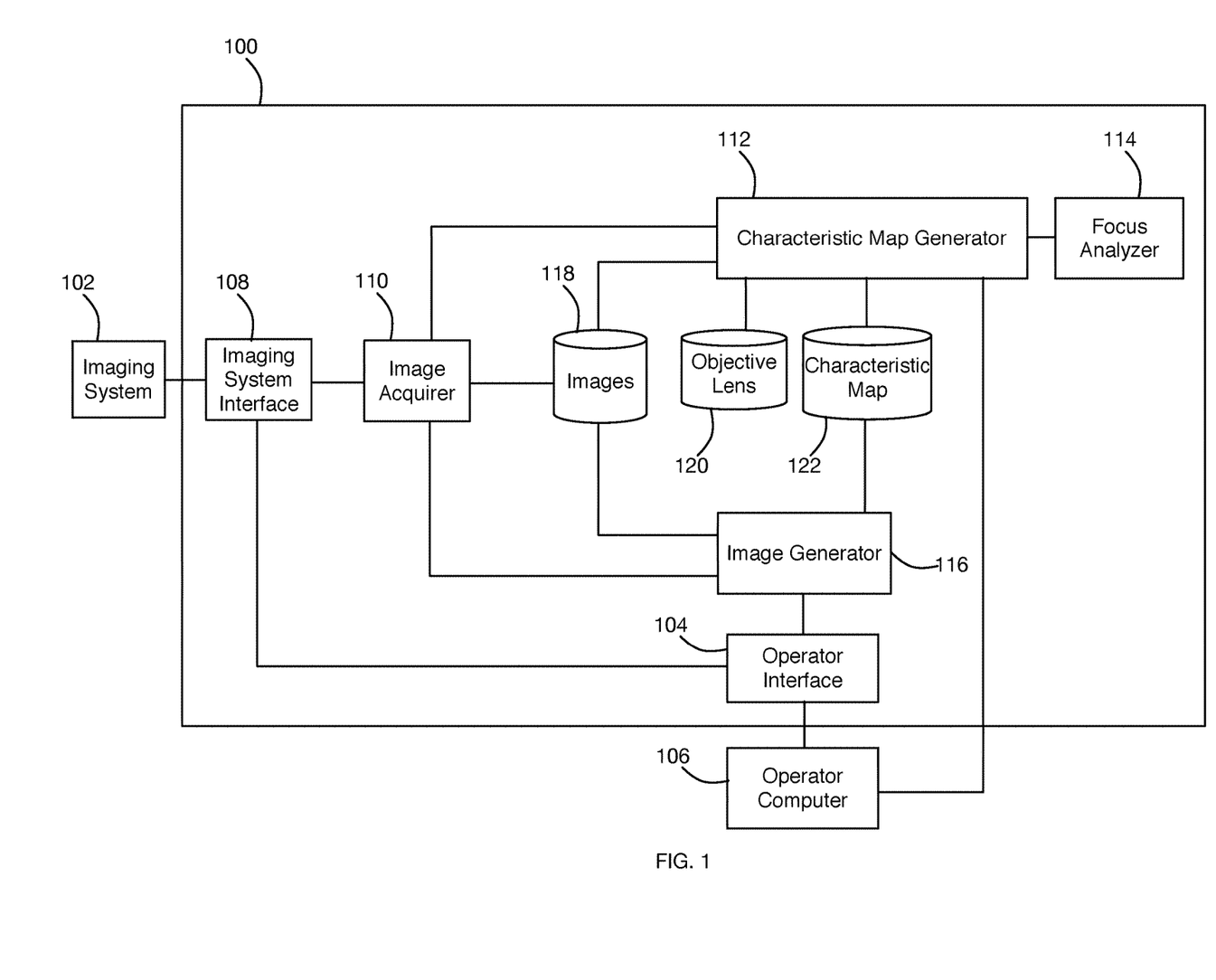
FIG. 1 is a block diagram of a system to produce focus-corrected images.
Figure 2:
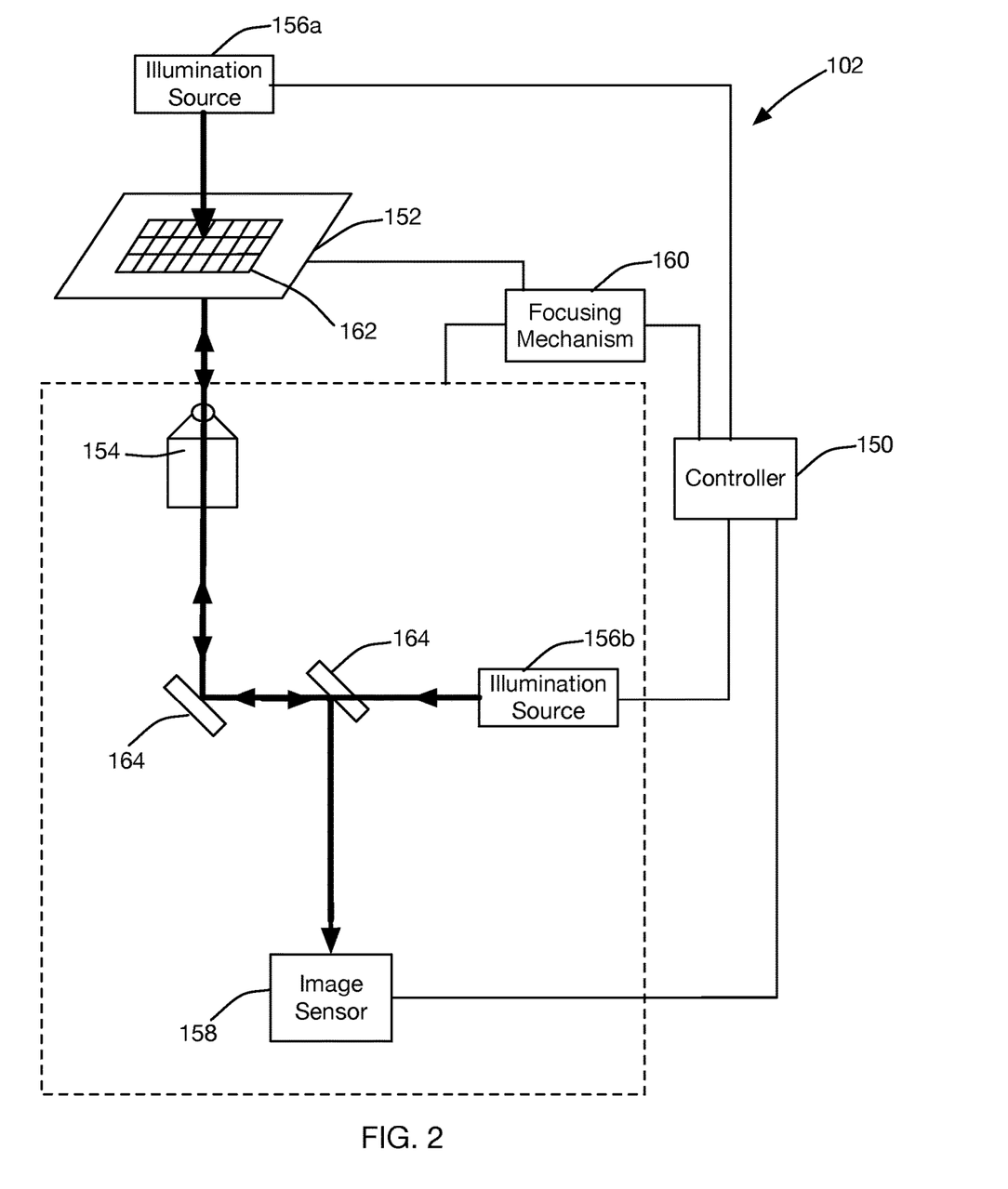
FIG. 2 is a block diagram of an imaging system that may be used with the system of FIG. 1 to produce focus-corrected images.

Referring to FIGS. 1 and 2, as is described in greater detail below, a focus correction system 100 operates with an imaging system 102 to generate a focus-corrected image of a sample disposed in the imaging system 102. The focus correction system 100 includes an operator interface 104 that communicates with an operator computer 106, an imaging system interface 108 that communicates with the imaging system 102, an image acquirer 110, a characteristic map generator 112, a focus analyzer 114, and an image generator 116. In addition, the focus correction system 100 includes an images data store 118, an objective lens database 120, and a characteristic map database 122.

In one embodiment, the imaging system 102 includes a controller 150 that communicates with the imaging system interface 108, an X-Y stage 152, one or more objective lens(es) 154, one or more illumination sources 156, an image sensor 158, and a focusing apparatus 160.

To generate a transmitted light image of a sample 162 disposed on the X-Y stage 152, the controller 150 operates an illumination source 156*a* to transmit light through the sample 162 disposed on the X-Y stage 152. The light is then directed through the objective lens 154, optionally redirected by mirrors 164 to form an image on a surface of the image sensor 158. The image sensor 158 generates signals in accordance with such image that are converted by the controller 150 into an output image of the imaging system 102.

To generate a fluorescent image of a sample 162 disposed on the X-Y stage 152, the controller operates an illumination source 156*b* to generate light that is redirected by the one or more mirrors 164, through the objective lens and to the sample 162. The light that reaches the sample 162 may excite the sample 162 and cause the sample 162 to fluoresce. The light emitted by the sample 162 passes through the objective lens and is directed by the one or more mirrors 164 to form an image on the surface of the image sensor 158, which generates signals in response to such image that are converted by the controller 150 into the output image.

A reflected light image of a sample 162 disposed on the X-Y stage 152 may be generated in a similar manner by redirecting light from the illumination source 156*b* to the sample 162 using one or more mirrors 164 and capturing any light reflected by the sample 162 and passed through the objective lens and directed by the one or more mirrors 164 to form an image on the surface of the image sensor 158.

In some embodiments, a focusing mechanism 160 is coupled to the objective lens 154, the image sensor 158, and the components (e.g., the illumination source 156*b* and the mirrors 164) to move these elements in unison along a substantially linear path either closer to or farther away from the X-Y stage. Alternately, the focusing mechanism 160 may be coupled to the X-Y stage 152 and move the X-Y stage 152 along a substantially linear path either closer to or farther away from the objective lens 154.

In some embodiments, the controller 150 may direct the focusing mechanism 160 to set the distance between the X-Y stage 152 and a reference portion of the objective lens 154 to be a particular amount. In some embodiments, such reference point is a top surface or portion of the objective lens 154 nearest the X-Y stage 152. In addition, the controller 150 may direct the focusing mechanism 160 to increase or reduce the distance between the X-Y stage 152 stage and a reference portion of the objective lens 154 by a particular amount. In the present disclosure, a distance between the objective lens 154 and the X-Y stage 152 is assumed to be the distance between the predetermined reference portion of the objective lens 154 and the X-Y stage 152.

The operator may use the operator computer 106 to instruct the focus correction system 100 to create a characteristic map for the objective lens 152 or to use an already created characteristic map to generate a focus corrected image of the sample 162 loaded on the X-Y stage 152.

The instruction to create the characteristic map for the objective lens 152 is received by the operator interface 104 of the focus correction system 100 from the operator computer 106. Such instruction includes an identifier of an objective lens 154 that is to be characterized and an indication that a focusing target has been loaded on the X-Y stage 152 of the imaging system 102. In some embodiments, the operator interface 104 instructs the operator computer 106 to display a predetermined list of identifiers associated with objective lenses that are available for use with the imaging system 102 and to request from the operator a selection of an identifier from such list. Alternately, the operator may enter into the operator computer 104 a string of one or more characters that represent(s) an identifier associated with the objective lens 154. Other ways providing an identifier of the objective lens identifier apparent to those who have ordinary skill in the art may be used.

In some embodiments, the operator loads the objective lens 154 in the imaging system 102 and a focusing target on the X-Y stage 152 before directing the operator computer 106 to instruct the focus correction system 100 to generate the characteristic map. In other embodiments, the operator computer 106 may be instructed by the operator interface 104 to prompt the user to load the focusing target and/or the objective lens 154 into the imaging system 102. In some embodiments, the operator interface 104 may receive the identifier associated with the objective lens and instruct the imaging system 102, via an imaging system interface 108, to automatically select and load the objective lens 154 associated with such identifier.

Figure 3:
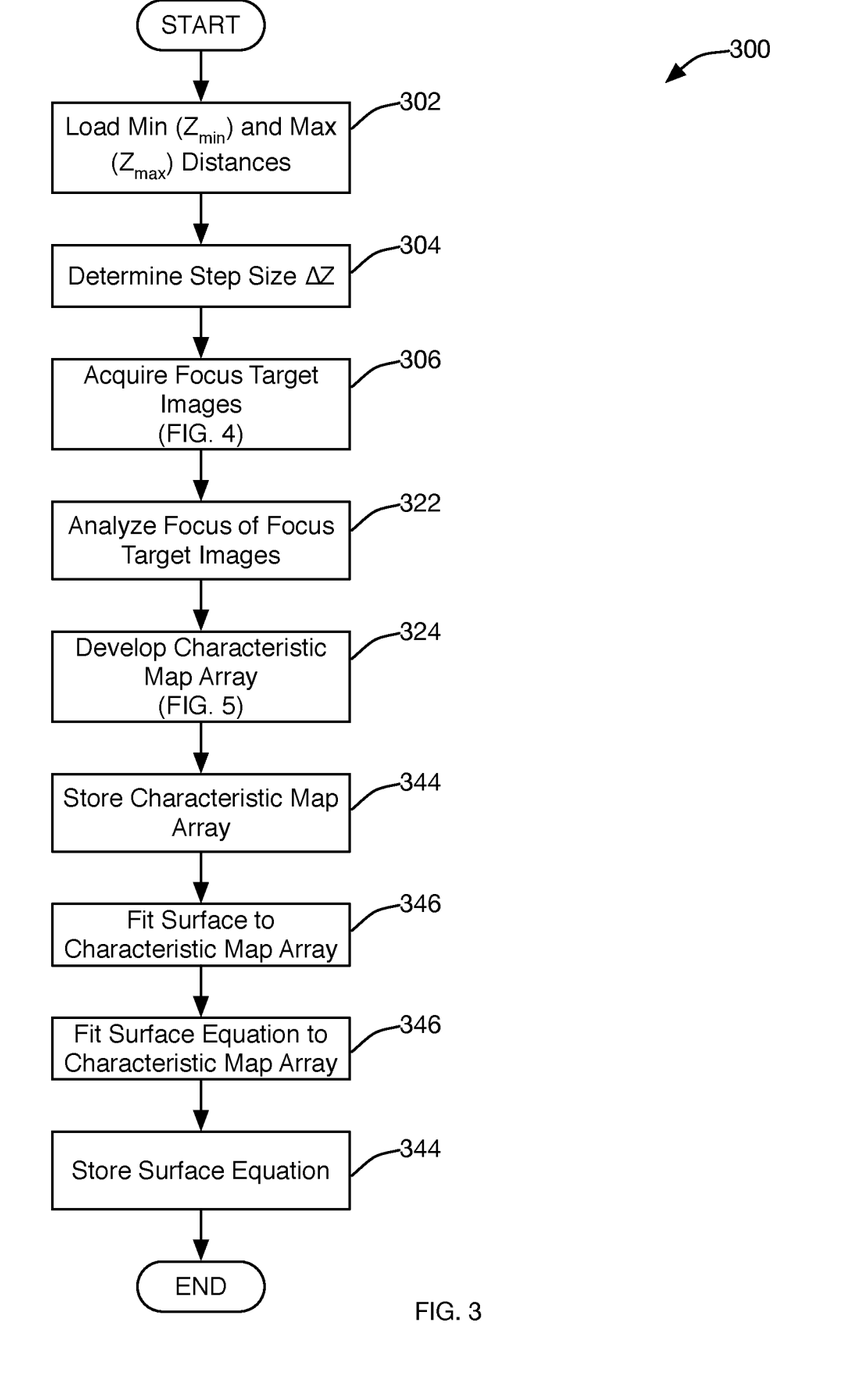
FIG. 3 is a flowchart of steps undertaken by a characteristic map generator of the system of FIG. 1.

After the focusing target and the objective lens 154 are loaded and the identifier of the objective lens 154 is received, the characteristic map generator 112 is invoked to create a characteristic map associated with the objective lens 154. FIG. 3 shows a flowchart 300 of the steps undertaken by the characteristic map generator 112 to create such characteristic map.

Referring to FIG. 3, at step 302, the characteristic map generator 112 uses the objective lens identifier to query the objective lens database 120 to obtain the characteristics of the objective lens 154 associated with such identifier. Such characteristics include a predetermined minimum distance ($Z_{min}$) and a predetermined maximum distance ($Z_{max}$) between the X-Y stage 152 and the objective lens 154 over which the plurality of focusing images should be acquired. At step 304, the characteristic map generator 112 determines a value $\Delta Z$ of the step size that the distance between the X-Y stage 152 and the objective lens 154 should be adjusted between sequential images. In some embodiments, the value $\Delta Z$ is stored in the object lens database 120 with other information about the objective lens 154. In other embodiments, the objective lens database 120 stores the resolving power of the objective lens 154 and the characteristic map generator 112 calculates the value $\Delta Z$ from such resolution. In one embodiment, the Nyquist frequency associated with such resolving power is calculated and the value $\Delta Z$ is set at a step size associated with such Nyquist frequency. In some embodiments, the value of $\Delta Z$ may be calculated in accordance with a depth-of-field of the objective lens 154, and such depth-of-field may be determined in accordance with the numerical aperture associated with the objective lens 154 and the wavelength(s) of light that are to be used to image the sample 162.

In some embodiments, the value $\Delta Z$ associated with a low-magnification objective lens 154 is between approximately 10 microns and 30 microns, and the value $\Delta Z$ associated with a high-magnification objective lens 154 is between 0.1 microns and 10 microns. In other embodiments, the value $\Delta Z$ associated with a low-magnification lens 154 is between approximately 50 microns and 100 microns, and the value $\Delta Z$ associated with a high-magnification objective lens 154 is between 0.2 microns and 1.0 micron.

Figure 4:
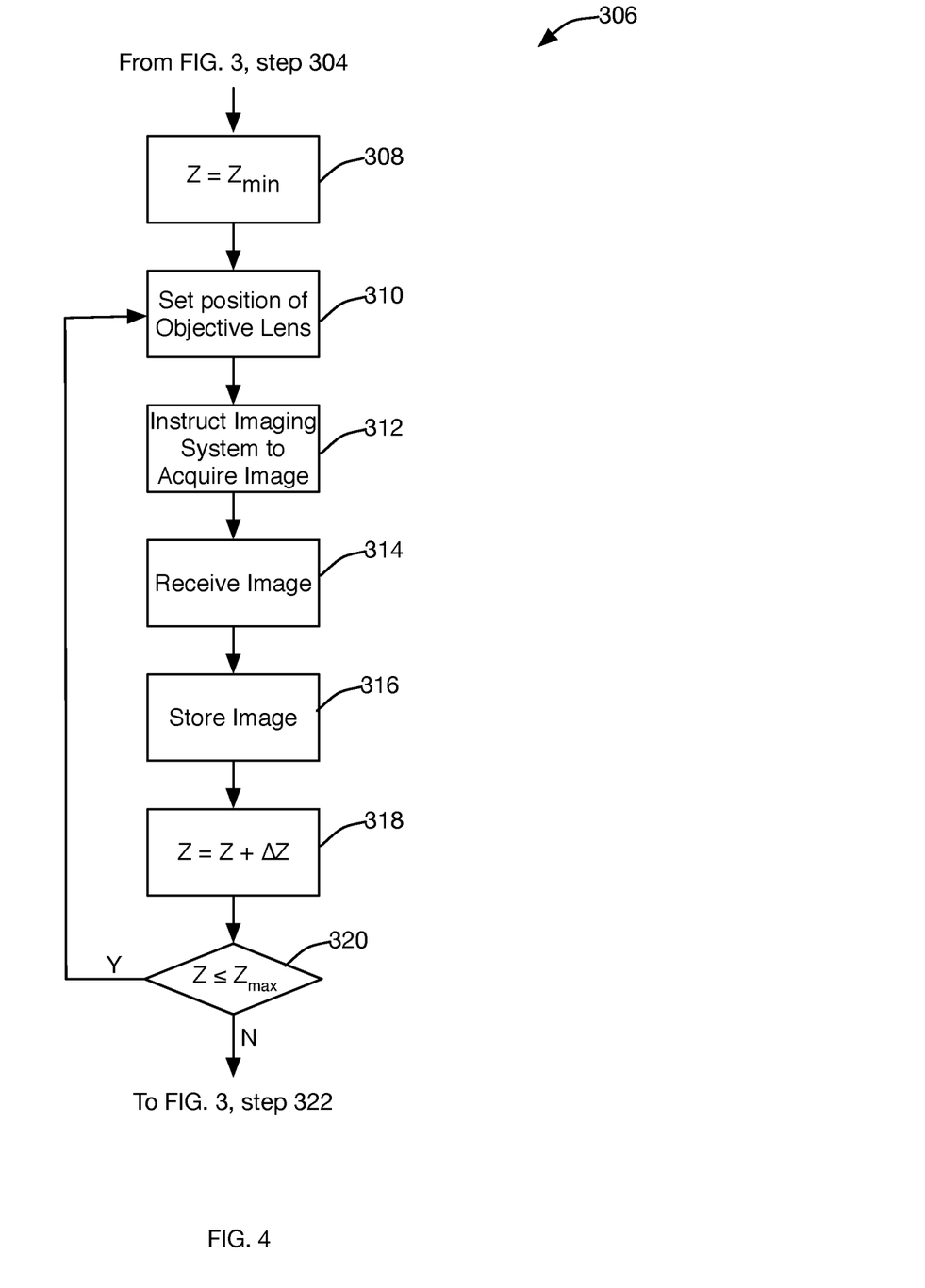
FIG. 4 is a flowchart of steps undertaken by an image acquirer of the system of FIG. 1.

Thereafter, at step 306, the characteristic map generator 112 directs the image acquirer 110 to obtain the plurality of focus target images, as shown in the flowchart depicted in FIG. 4.

Referring to FIG. 4, at step 308, the image acquirer 110 sets a value of a variable Z to the value $Z_{min}$. At step 310, the image acquirer 110 directs the imaging system interface 108 to instruct the controller 150 of the imaging system 102 to move, if necessary, the objective lens 154 such that the objective lens 154 is at the distance Z from the focus plane of the focusing target disposed on the X-Y stage 152. At step 312, the image acquirer 110 instructs, via the imaging system interface 108, the controller 150 of the imaging system to operate the illumination source 156 and the image sensor 158 to acquire an image of the focus target disposed on the X-Y stage 152. At step 314 the image acquirer 110 receives the acquired image, via the imaging system interface 108. The image acquirer, at step 316, stores in the images data store 118 the acquired image of the focus target and associates such stored image with the value of the variable Z. In some embodiments, the images data store 118 includes a database for tracking the plurality of focus target images associated with an objective lens 154. In such embodiments, the image acquirer 110 creates an entry in such database that includes the value of the variable Z and the acquired image associated with such variable. In other embodiments, the acquired image is stored having a file name that includes the value of the variable Z. Other ways of associating an image stored in the images data store 118 with the value of the variable Z apparent to one who has ordinary skill in the art may be used.

Thereafter, at step 318, the image acquirer 110 increments the value of the variable Z by the value $\Delta Z$. At step 320, the image acquirer 110 determines if the value of the variable Z is less than or equal to the value $Z_{max}$ and, if so, returns to step 310 to increase the distance between the objective lens 154 and the X-Y stage 152 and acquire another image. Otherwise, processing proceeds to step 322 (FIG. 3).

At step 322, for each focus target image acquired and stored in step 306, the characteristic map generator 112 invokes the focus analyzer 114. The focus analyzer 114 applies a focus measure operator to the image to develop a value for each pixel that represents a quality of focus of such pixel relative to pixels in an area surrounding such pixel. As would be apparent to one who has ordinary skill in the art, such focus measure operator analyzes image gradient data, edge data, wavelet coefficients, discrete cosine transform coefficients, and the like to assess the focus of a region of the image. For each focus target image analyzed, the focus analyzer 114 generates a two-dimensional focus assessment array of values. The focus assessment array has dimensions identical to those of the focus target image so that each element of the array corresponds to a pixel of the focus target image. The value of each element of the array is an indication of the focus of a region surrounding a pixel to which such element corresponds.

In some embodiments, the focus value of the element of the array is determined by analyzing the quality of focus of a region of pixels that is, for example, 200-pixels by 200-pixels of each focus target associated with such element. In some embodiments, such analysis identifies the focus target image that has the highest frequency content in the region associated with the element and the Z value associated with such focus target is used as the focus value. In some embodiments, such frequency analysis may be undertaken on the intensity values of pixels in such region, wherein higher frequency is associated with better focus. In some embodiments, a three-dimensional assessment may be undertaken to identify a distance between the objective lens 154 and the X-Y stage 152 that results in an image associated with best focus associated with such element and such distance represents the focus value. In some embodiments, the image may be subsampled, and the array may include an element that is associated with a number of pixels. The value of such element may be determined by calculating a median, or other statistic, of the focus scores of the pixels associated with the element.

Figure 5:
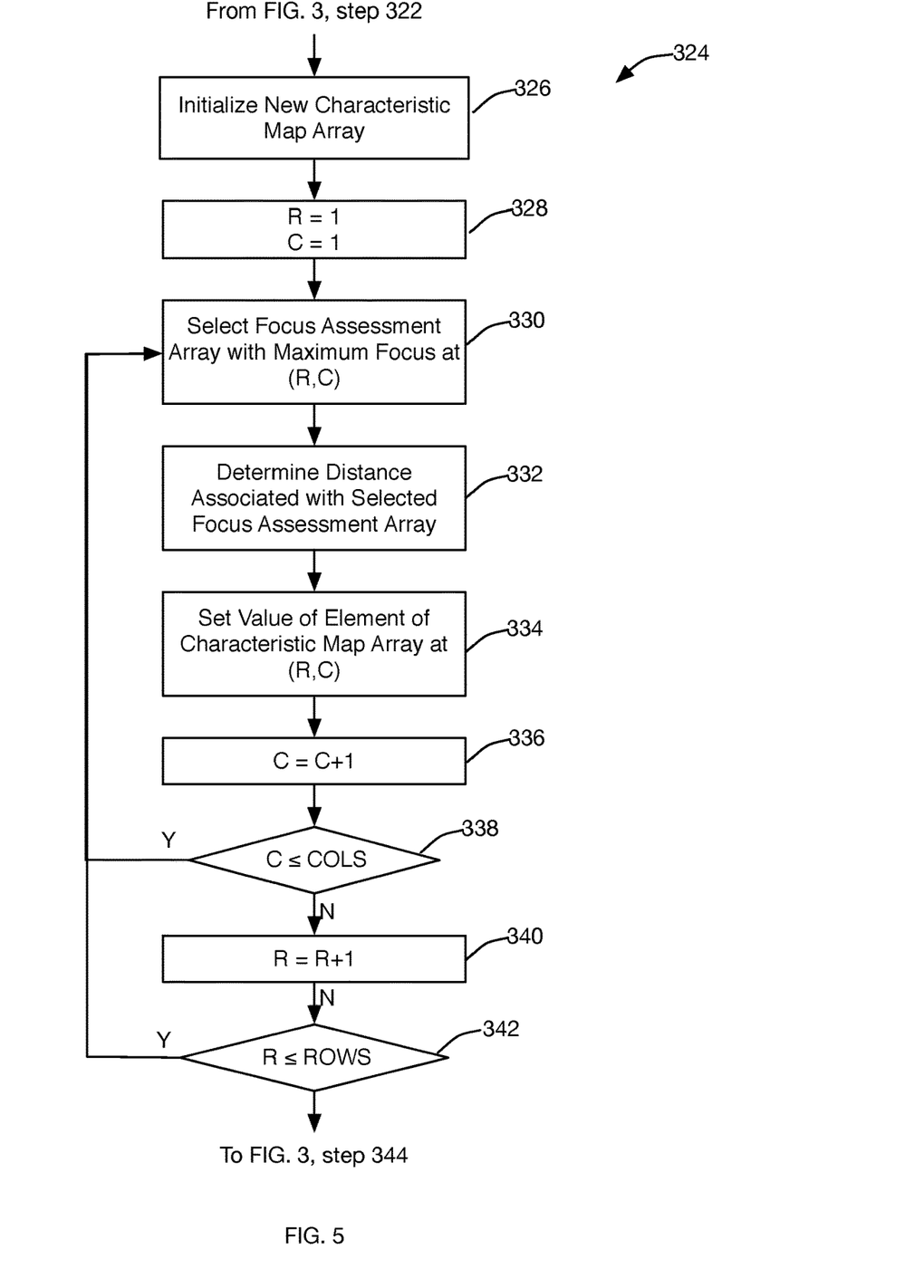
FIG. 5 is a flowchart of additional steps undertaken by the characteristic map generator of the system of FIG. 1.

At step 324, the characteristic map generator 112 analyzes the focus assessment arrays generated at step 322 to develop a characteristic map array. FIG. 5 shows a flowchart of the steps undertaken by the characteristic map generator 112 to develop the characteristic map array.

Referring to FIG. 5, at step 326, the characteristic map generator 112 initializes the characteristic map array. The dimensions of the characteristic map array are identical to the dimensions of the focus assessment arrays generated by the focus analyzer 114 at step 322.

At step 328, the characteristic map generator 112 sets values of variables R and C to one. These variables are used to iterate over each element of the characteristic map array. At step 330, the characteristic map generator 112 checks the elements at row R and column C of the all of the focus assessment arrays to select the focus assessment array that has a highest focus value (i.e., a value associated with the best focus) at row R and column C. The characteristic map generator 112 then, at step 332, determines the value of the variable Z (i.e., the distance between the objective lens 154 and the X-Y stage 152) associated with the selected focus assessment array. At step 334, the characteristic map generator 112 sets a value of an element of the characteristic map array at row R and column C to the value of the variable Z associated with the focus assessment array selected at step 330.

At step 336, the characteristic map generator 112 increments the value of the variable C and, at step 338, checks to determine if the value of the variable C is less than or equal to the number of columns in the characteristic map array. If so, the characteristic map generator 112 returns to step 330. Otherwise, at step 340, the characteristic map generator 112 increments the value of the variable R and, at step 342, checks to determine if the value of the variable R is less than or equal to the number of rows in the characteristic map array. If so, the characteristic map generator 112 returns to step 330. Otherwise, the characteristic map generator 112 proceeds to step 340 (FIG. 3).

In some embodiments, after the values of all of the elements of the characteristic map array have been developed as described above, the characteristic map generator 112 may apply a smoothing filter to the values of the characteristic map array. Such smoothing filter may include, for example, a median filter, noise reduction filter, gaussian filter, morphology open/close filter, and the like.

Referring once again to FIG. 3, in some embodiments the characteristic map array developed at step 324 is stored in the characteristic map data store 122 as associated with the identifier of the objective lens 154 used to create the focus target images from which the characteristic map array was developed.

In some embodiments, at step 346, the characteristic map generator 112 may fit a three-dimensional surface equation to the values in the characteristic map array. The surface equation represents an algebraic function that maps a row and a column of the characteristic map array to the value of the element at such row and column. To determine such function, the characteristic map generator 112 to may fit a b-spline function, a polynomial function, or any other type of function apparent to one of ordinary skill in the art to the values of the elements of the characteristic map array using, for example, a least-squares fitting technique. In some embodiments, the characteristics data associated with the objective lens 154 retrieved from the objective lens database may include information regarding a predetermined type of function that would be appropriate to fit to the values in the characteristic map array.

Fitting an equation to the characteristic map array may reduce the effects of noise or other image artifacts in the focus target images captured using the objective lens 154 or errors in developing focus values associated with pixels of such images.

At step 344 the characteristic map generator 112 stores the surface equation as a characteristic map associated with the objective lens 154 in the characteristic map data store 122. Thereafter, the characteristic map generator 112 exits.

After the characteristic map has been created and stored as described above, the operator may load a sample 162 to be imaged in the imaging system 102, select an identifier associated with an objective lens 154 as described above, and use the operator computer 106 to instruct the focus correction system 100 to generate a focus-corrected image of the sample 162 using the objective lens 154.

Figure 6:
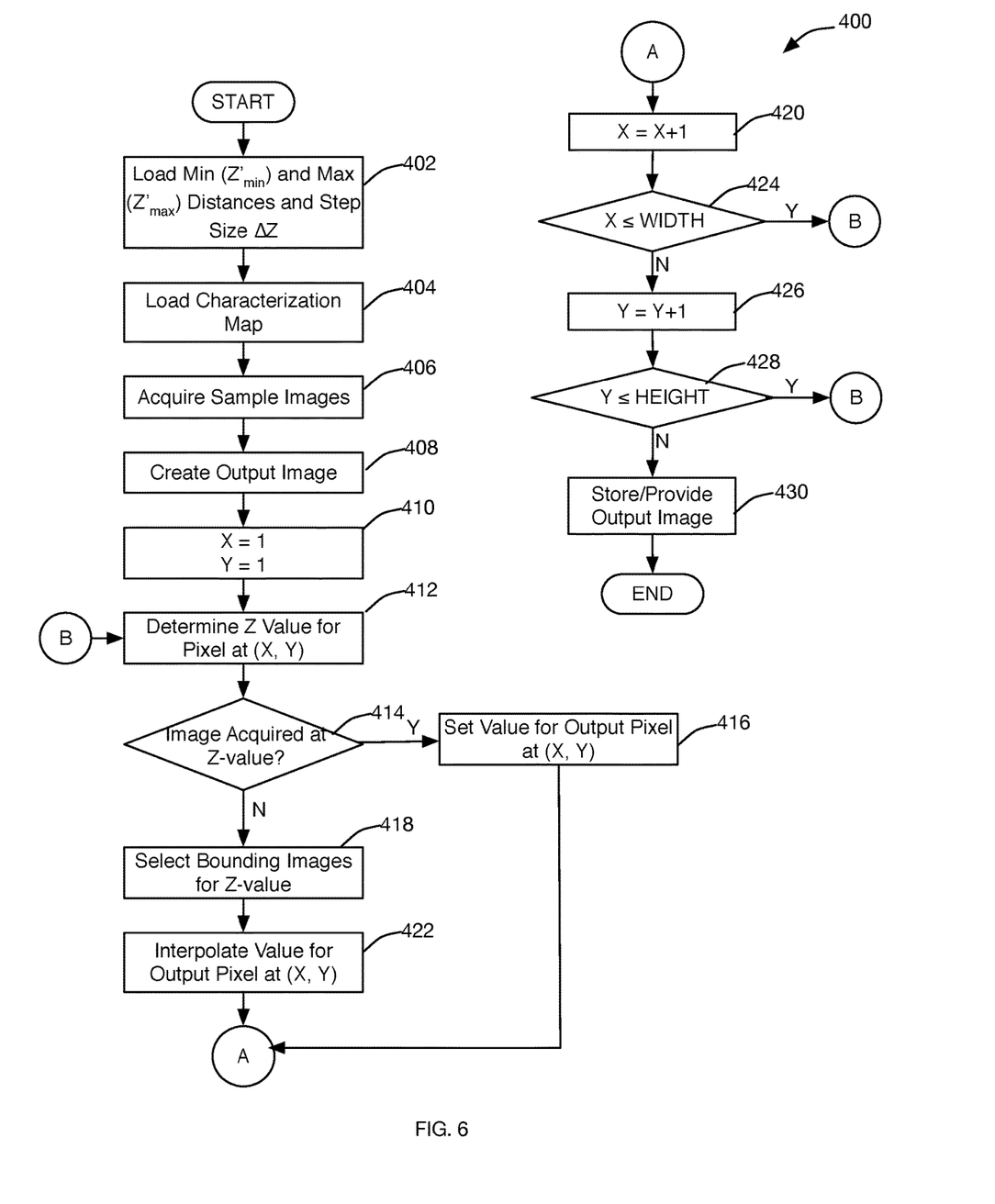
FIG. 6 is a flowchart of steps undertaken by an image generator of the system of FIG. 1.

In response, the image generator 116 uses the imaging system 102 and the characteristic map stored in the characteristic map data store 122 to generate a focus-corrected image of the sample 162. FIG. 6 shows a flowchart 400 of the steps the image generator 116 undertakes to generate such focus-corrected image.

Referring to FIG. 6, at step 402, the image generator 116 queries the objective lens database 120 for information regarding the objective lens 154 that is to be used to generate the focus-corrected image of the sample 162. The information retrieved by the image generator 116 includes a minimum distance ($Z'_{min}$) and a maximum distance ($Z'_{max}$) between the objective lens 154 and the focus plane of the sample 162 disposed on the X-Y stage 152 over images the image generator 116 will capture images of the sample 162 to generate the focus-corrected image.

It should be apparent to one who has ordinary skill in the art that the focus plane of the sample 162 may be determined, for example, using an auto-focus mechanism associated with the imaging system 102 such as, for example, a laser based focusing system.

The information also includes a step size ($\Delta Z'$) that the distance will be adjusted between sequential images of the sample 162. The values of $Z'_{min}$, $Z'_{max}$, and $\Delta Z'$ used to generate the focus-corrected image of the sample 162 may be identical to the values of $Z_{min}$, $Z_{max}$, and $\Delta Z$ used to generate the characteristic map associated with the objective lens 154. Alternately, such values may be different. For example, having a value of $\Delta Z'$ greater than the value of $\Delta Z$ reduces the number of images of the sample 162 that are acquired, and thus reduces the amount of time necessary to generate the focus-corrected image. In some embodiments, the operator may be provided via the operator computer 106 to select from a fast speed imaging mode associated with a relatively large value of $\Delta Z'$, a medium speed imaging mode associated with a smaller value of $\Delta Z'$, and a slow speed imaging mode with a value of $\Delta Z'$ identical to the value of $\Delta Z$.

At step 404, the image generator 116 loads, from the characteristic map data store 122, the characteristic map associated with the objective lens 154 being used to image the sample 162. If a surface equation has been created from the characteristic map array as described above, the image generator 116 loads the surface equation as the characteristic map. Otherwise the image generator 116 loads the characteristic map array as the characteristic map.

At step 406, the image generator 116 invokes the image acquirer 110 to acquire a plurality of images of the sample 162 with the objective lens 154. The image acquirer 110 undertakes steps substantially identical to those shown in FIG. 4 to acquire the plurality of focus target images, except the values $Z'_{min}$, $Z'_{max}$, and $\Delta Z'$ are used instead of the $Z_{min}$, $Z_{max}$, and $\Delta Z$, respectively, in steps 308, 318 and 320. Also, the image acquirer 110 sets the distance between the object lens 154 and the focus plane of the sample 162 on the X-Y stage 152 rather than the distance between the objective lens 154 and the X-Y stage in step 310. Further, after step 320 processing proceeds to step 406 instead of step 322 if the value of the variable Z is not less than or equal to the value of $Z'_{max}$.

At step 408, the image generator 116 creates and initializes an output image that has the same dimensions as the images acquired by the image acquirer 110. At step 410, the image generator 116 sets values of both variables X and Y to one. These variables are used to iterated through pixels along the width and the height, respectively, of the output image.

At step 412, the image generator 116 determines a value of the characteristic map that corresponds to a pixel of the output image at coordinates (X, Y). In some embodiments, such value is the value of the element at row X and column Y of the characteristic map array. As described above, such value, i.e. Z-value, represents the distance between the objective lens 154 and the focus plane of the focusing target disposed on the X-Y stage 152 at which the focus of the region containing the pixel at coordinates (X, Y) of the image generated by the imaging system 102 was best. If the characteristic map is the surface function, then such Z-value is calculated by applying the surface function to the coordinates (X, Y). If the characteristic map is the characteristic map array, such Z-value is the value of the array element at coordinates (X, Y).

It is possible that if the values of one or more of $Z'_{min}$, $Z'_{max}$, and $\Delta Z'$ loaded at step 402 are not identical to the values $Z_{min}$, $Z_{max}$, and $\Delta Z$, respectively, used to create the characteristic map, then there may not be any focus target image that was captured at the Z-value associated with the pixel at coordinates (X,Y) when the characteristic map was developed.

At step 414, the image generator 116 determines whether any of the images acquired at step 406 were acquired when the distance between the objective lens 154 and the focus plane of the sample 162 were substantially identical to the Z-value. If so, the image generator proceeds to step 416, otherwise the image generator 116 proceeds to step 418.

At step 416, the image generator 116 sets an intensity value of the pixel at coordinates (X, Y) of the output image to an intensity value of a pixel at coordinates (X, Y) of the image acquired at step 406 when distance between the objective lens 154 and the focus plane of the sample 162 was substantially identical to the Z-value determined at step 412. Thereafter, the image generator proceeds to step 420.

If there is no image captured at step 406 associated with the Z-value determined at step 412, then at step 418, the image generator 116 selects a first image and a second image obtained at distances $Z_1$ and $Z_2$, respectively, wherein $Z_1$ is less than the Z-value and $Z_2$ is greater than the Z-value and the values $Z_1$ and $Z_2$ are nearest to the Z-value (i.e., the values $Z_1$ and $Z_2$ bound the Z-value).

Thereafter, at step 422, the image generator 116 determines the intensity value of the output pixel at coordinate (X, Y) by, for example, linearly interpolating between the intensity value of the pixel at coordinate (X, Y) of the first image and the intensity value of the pixel at coordinate (X, Y) of the second image. It should be apparent to one who has skill in the art, that other types of interpolation, e.g., cubic interpolation, may be used.

After developing the pixel at the coordinate (X, Y) of the output image, the image generator 116, at step 420, increments the value of the variable X by one and, at step 424, determines if the value of X is less than or equal to the number of pixels along a width of the output image. If so, the image generator 116 proceeds to step 412 to develop the intensity value of another pixel along the width of the output image. Otherwise the image generator 116 proceeds to step 426.

At step 426, the image generator 116 increments the value of the variable Y by one and, at step 428, determines the value of the variable Y is less than or equal to number of pixels along the height in the output image. If so, the image generator 116 proceeds to step 412 to develop another pixel of the output image. Otherwise, at step 430, the image generator 116 stores the output image in the images data store 118 for further analysis and/or transmits such image to the operator computer 106 and/or another system (not shown) for display and/or further analysis. Such further analysis may include classifying objects in the focus-corrected image as being biological cells, organelles, and the like, counting objects that have been classified as being a particular type, measuring the area and/or perimeter of such objects, and the like.

Figure 6A:
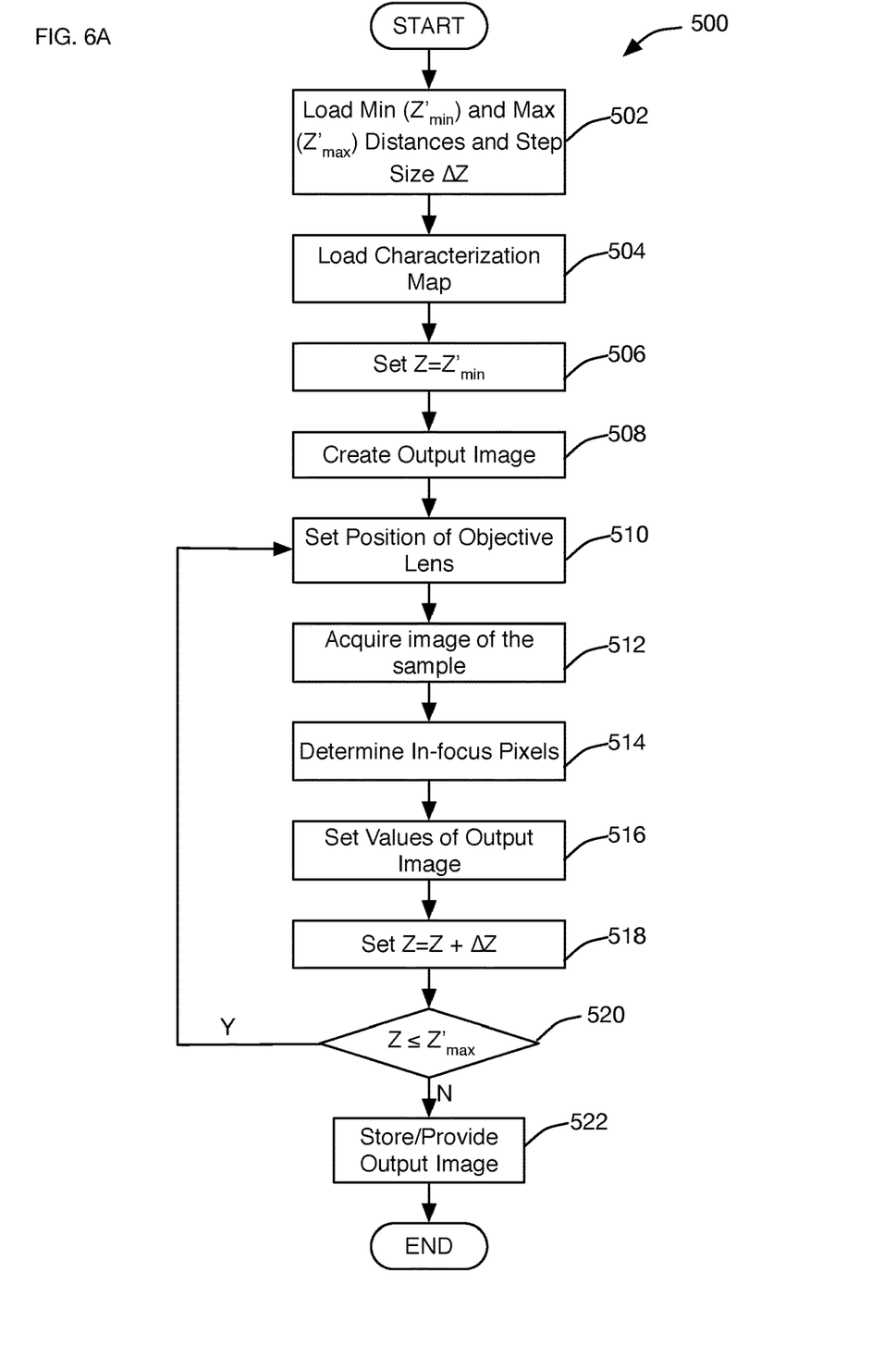
FIG. 6A is another flowchart of steps undertaken by an image generator of the system of FIG. 1.

In some embodiments, instead of acquiring and storing a plurality of images of the sample at step 406 and then developing intensity values of the pixels of the output image at steps 410-428, the image generator 116 may generate certain pixels of the output image after each image of the sample 162 is captured. FIG. 6A is a flowchart 500 of processing undertaken by the image generator 116 to generate the output image in this manner.

Referring to FIG. 6A, at step 502 the image generator 116 loads values of $Z'_{min}$, $Z'_{max}$, and the step size $\Delta Z$, as described above in connection with step 402 of FIG. 6. At step 504, the image generator 116 loads the characterization map associated with the objective lens, as described above in connection with step 404 of FIG. 4. At step 506, the image generator 116 sets a value of a variable Z to $Z'_{min}$. At step 508, the image generator 116 creates a new output image.

At step 510, the image generator 116 directs the image acquirer 110 to position the objective lens 154 to be at a distance Z from the focus plane of the sample 162, and at step 512 directs the image acquirer 110 to capture an image of the sample 162.

At step 514, the image generator 116 uses the characteristic map associated with the objective lens 154 to determine the pixels of the acquired image captured at a distance Z between the object lens 154 and the sample 162 that should be included in the output image (i.e., those pixels of the acquired image that are in-focus at such distance Z). In particular, the image generator 116 identifies the elements in the characteristic map that have a value equal to Z or within ΔZ of Z.

At step 516, for each pixel of the output image that corresponds to an element of the characteristic map identified at step 514, the image generator 116 sets an intensity value of such pixel of the output image to an intensity value of a pixel of the image captured at step 512 corresponding thereto.

At step 518, the image generator 116 increments the value of Z by the value of ΔZ, and at step 520 determines if the value of Z is less than or equal to the value of $Z'_{max}$. If so, the image generator 116 proceeds to step 510. Otherwise, the image generator 116 proceeds to step 522 to store and/or provide the output image as described above in connection with step 430 of FIG. 6.

As described above, in connection with steps 418 and 422 of FIG. 4, the position of the objective lens at which a particular pixel is in focus may be between two distances at which images of the sample were captured at step 512. In such situations, the image generator 116 determines an intensity of the output pixel, at step 516, from pixels of two (or more) images acquired at step 512, as described in connection with step 422 of FIG. 4.

In some embodiments, a plurality characteristic maps may be created for the objective lens 154, each characteristic map being associated with a particular imaging configuration. For example, a first characteristic map may be created from a first plurality of focus target images obtained by imaging light transmitted through a first focus target, a second characteristic map may be created from a second plurality focus target images generated by imaging fluorescence emitted by a second focus target when excited by first particular wavelength of light, a third characteristic map may be created from a third plurality of focus target images generated by imaging the fluorescence emitted by a third focus target when excited by a second particular wavelength of light, and the like. In some embodiments, the image generator 116 uses the characteristic map developed using a particular imaging configuration to develop an output image of a sample 162 from a plurality of images acquired under the same particular imaging configuration. In other embodiments, the image generator 116 may use a characteristic map acquired using a first imaging configuration to develop a focus corrected image of the sample 162 from a plurality of images of the sample 162 acquired using a second imaging configuration.

A characteristic map developed for a first objective lens 154 using a plurality of focus target images acquired using the first objective lens 154 in a first imaging system 102 may be used by an image generator 116 to develop a focus corrected output image from a plurality of images of a sample 162 acquired using a second objective lens 154 in the first or a second imaging system 102, wherein the first and the second objective lenses 154 have similar characteristics.

It should be apparent to one who has ordinary skill in the art that additional image processing functions may be applied to a plurality of images of a sample 162 before a focus corrected image is generated therefrom by the image generator 116 including, for example, flat field correction, background intensity correction, and the like. Similarly, one or more additional image processing functions may be applied to the focus corrected image of the sample 162 developed by the image generator 116.

The embodiments described to develop the characteristic map and a focus corrected image of a sample 162 using such characteristic map may be used in combination with an imaging system 102 that uses bright field, fluorescent, or confocal imaging.

Although the image generator 116 has been described to generate a focus corrected two-dimensional image of a sample 162 taken at particular focus plane thereof, it should be apparent that the image generator 116 may be used to create a plurality of images of the sample 162 taken at various focus planes. Each image of such plurality of images could be corrected for focal aberrations of the objective lens 154. This plurality of images can be used as a Z-stack of images that facilitates viewing a focus-corrected three-dimensional image rendition of the sample 162 and/or facilitates three-dimensional analysis of objects represented by the Z-stack the image. Such analysis may include counting the number of three-dimensional objects in the image, characterizing the type of such objects (e.g., as a cell, an organelle, and the like), measuring the volumes and/or surface areas of such objects, and the like.

It should be apparent to those who have skill in the art that any combination of hardware and/or software may be used to implement the focus correction system 100 described herein. It will be understood and appreciated that one or more of the processes, sub-processes, and process steps described in connection with FIGS. 1-6 may be performed by hardware, software, or a combination of hardware and software on one or more electronic or digitally-controlled devices. The software may reside in a software memory (not shown) in a suitable electronic processing component or system such as, for example, one or more of the functional systems, controllers, devices, components, modules, or sub-modules schematically depicted in FIGS. 1-6. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module or controller (e.g., the operator interface 104, the imaging system interface 108, the image acquirer 110, the characteristic map generator 112, the focus analyzer 114, and the image generator 116 of FIG. 1), which includes, for example, one or more microprocessors, general purpose processors, combinations of processors, digital signal processors (DSPs), field programmable gate arrays (FPGAs), application-specific integrated circuits (ASICs), and/or graphics processing units (GPUs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

It should be apparent to one who has skill in the art that one or more components of the focus correction system 100 may operate in a cloud environment, for example, using distributed computing and storage systems connected over a local or wide area network (e.g., the Internet or a private network). For example, one or more of the operator interface 104, the imaging system interface 108, the image acquirer 110, the characteristic map generator 112, the focus analyzer 114, and the image generator 116 may operate on one or more computer(s) remote from the operator computer 106, the imaging system 102, and/or one another. In one such configuration, for example, the imaging system interface 108 may communicate with the controller 150 over the local or wide area network to acquire images from the imaging system 102 and store images acquired in this manner in a cloud-based images data store 118. The characteristic map generator 112 operating locally or in the cloud may access objective lens 154 information from an objective lens database 120 stored locally or in the cloud, develop the characteristic map, and store the characteristic map in the characteristic map data store 102 that local or in a cloud-based storage system. The image generator 116 (operating on a local server or in the cloud environment) may access the characteristic map stored in the characteristic map data store 122 to develop the output image.

The executable instructions may be implemented as a computer program product having instructions stored therein which, when executed by a processing module of an electronic system, direct the electronic system to carry out the instructions. The computer program product may be selectively embodied in any non-transitory computer-readable storage medium for use by or in connection with an instruction execution system, apparatus, or device, such as an electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical).

It will also be understood that receiving and transmitting of signals or data as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A computer implemented system for generating an output image of a sample using an imaging system comprising a stage on which the sample is disposed, an image sensor, and a lens moveable relative to the stage between a first position and a second position, wherein the image sensor generates a two-dimensional array of pixels, comprising:
   an image acquirer operating on a processor that receives a plurality of images of the sample from the image sensor, wherein each image of the plurality of images of the sample is captured when the lens is positioned at a corresponding one of a first plurality of predetermined locations of the lens between the first position and the second position;
   a characteristic map generator that develops a characteristic map array that associates each pixel of a two-dimensional array of pixels with one of a second plurality of predetermined location and applies a smoothing filter to the characteristic map array to develop the characteristic map, wherein the characteristic map is developed from a focus target image of focusing target disposed on the stage, wherein the focusing target is other than the sample, and associates coordinates of each pixel of the two-dimensional array of pixels generated by the image sensor with one of the second plurality of predetermined locations of the lens between the first position and the second position; and
   an image generator that:
   selects a location from the second plurality of predetermined locations associated with coordinates of an output image pixel in accordance with the characteristic map;
   selects an image from the plurality of images of the sample in accordance with the location; and
   determines a value of the output image pixel in accordance with a value of a corresponding pixel of the selected image of the plurality of images of the sample;

wherein the first position of the lens is at a first distance from the stage and the second position of the lens is at a second distance from the stage.

2. The computer-implemented system of claim 1, wherein the focus target image comprises a plurality of focus target images and further including a characteristic map generator, wherein the characteristic map generator analyzes the plurality of focus target images, each focus target image having been captured when the lens is positioned at a corresponding one of the second plurality of predetermined locations.

3. The computer-implemented system of claim 2, further including a focus analyzer that analyzes the focus of each focus target image to associate a value representing focus of a region surrounding each pixel of the focus target image.

4. The computer-implemented system of claim 3, wherein the characteristic map generator generates a characteristic map array, wherein for each element of the characteristic map array, the characteristic map generator selects a focus target image having a maximum focus score associated with such coordinates of such element.

5. The computer-implemented system of claim 1, wherein the characteristic map generator fits a surface equation to the characteristic map array.

6. The computer-implemented system of claim 2, wherein the characteristic map generator operates on a first computer and the image generator operates on a second computer, wherein the first computer and the second computer are in remote locations form one another.

7. The computer-implemented system of claim 1, wherein the first plurality of predetermined locations is different from the second plurality of predetermined locations and the location comprises a first location, and the image generator determines a second location from the first location and selects the image from the plurality of images of the sample that is associated with the second location.

8. The computer-implemented system of claim 1, wherein the image generator develops a plurality of two-dimensional arrays of output image pixels to produce a Z-stack of images representing a three-dimensional representation of the sample.

9. The computer-implemented system of claim 1, wherein the imaging system is at a location remote from the computer-implemented system.

10. A method of generating an output image of a sample using an imaging system, wherein the imaging system includes a sample holder on which the sample is disposed, an image sensor that generates a two-dimensional array of pixels, and a lens moveable relative to the sample holder between a first position and a second position, comprising the step of:

causing one or more computing devices to undertake:

developing a characteristic map associated with the lens, wherein the characteristic map is developed from a focus target image of a focusing target disposed on the stage, wherein the focusing target is other than the sample, including associating coordinates of each pixel of a two-dimensional array of pixels generated by the imaging sensor with one of a first plurality of predetermined locations of the lens between the first position and the second position and applying a smoothing filter to the two-dimensional array of pixels;

receiving a plurality of images of the sample from the image sensor, wherein each of the plurality of images of the sample is captured when the lens is positioned at a corresponding one of a second plurality of predetermined locations of the lens between the first position and the second position;

selecting a location from the first plurality of predetermined locations associated with coordinates of an output image pixel in accordance with the characteristic map;

selecting an image of the plurality of images of the sample in accordance with the location; and determining a value of the output image pixel in accordance with a value of a pixel of the selected image selected from the plurality of images of the sample that corresponds to the output image pixel;

wherein the first position is at a first distance from the stage and the second position is at a second distance from the stage.

11. The method of claim 10, wherein the focus target image comprises a plurality of focus target images and further including the step of analyzing the plurality of focus target images, each focus target image having been acquired when the lens is positioned at a corresponding one of the first plurality of predetermined locations.

12. The method of claim 11, further including the step of analyzing the focus of each focus target image to associate a value representing focus of a region surrounding each pixel of the focus target image.

13. The method of claim 12, further including the steps of generating a characteristic map array having a plurality of elements, and for each element of the characteristic map array selecting a focus target image having a maximum focus value associated with such coordinates of such element.

14. The method of claim 10, wherein developing the characteristic map includes fitting a surface equation to the characteristic map array.

15. The method of claim 11, wherein the step of developing the characteristic map array is undertaken on a first computing device and the step of developing the output image pixel is undertaken on a second computing device, wherein the first computing device and the second computing device are in remote locations from one another.

16. The method of claim 10, wherein the first plurality of locations is different from the second plurality of locations and the first location comprises a first location, further comprising developing a second location from the second plurality of location in accordance with the first location, and wherein selecting the image from the plurality of images of the sample comprises selecting the image associated with the second location.

17. The method of claim 10, further including developing a plurality of output images to produce a Z-stack of images representing a three dimensional representation of the sample, wherein the output image pixels of the plurality of output images are generated in accordance with the characteristic map.

18. The method of claim 10, wherein the imaging system is at a location remote from at least one of the computing devices.

* * * * *